Dec. 8, 1925.
A. STUCKI
1,564,380
ROLLER SIDE BEARING
Filed June 10, 1924
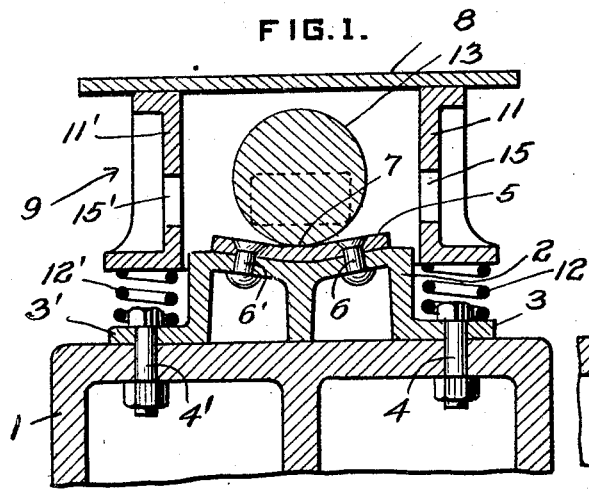
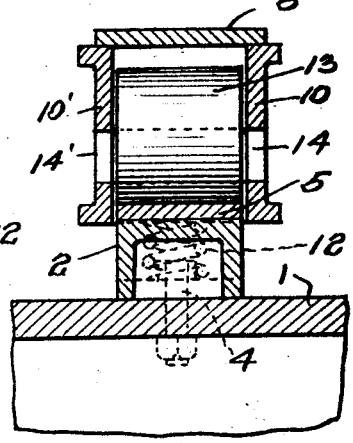
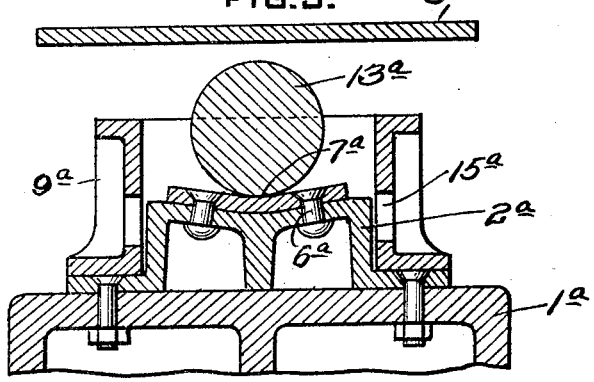
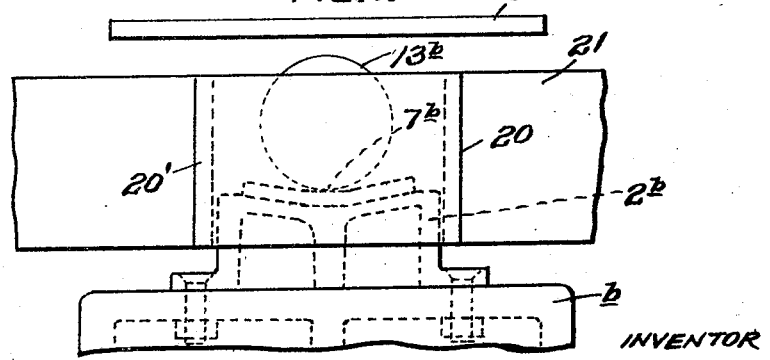
WITNESSES
J. Herbert Bradley
C. R. Halbert
INVENTOR
Arnold Stucki
By Winter, Brown & Critchlow
His Attys.

Patented Dec. 8, 1925.

1,564,380

UNITED STATES PATENT OFFICE.

ARNOLD STUCKI, OF PITTSBURGH, PENNSYLVANIA.

ROLLER SIDE BEARING.

Application filed June 10, 1924. Serial No. 719,071.

*To all whom it may concern:*

Be it known that I, ARNOLD STUCKI, a citizen of the United States, and a resident of Pittsburgh, in the county of Allegheny and State of Pennsylvania, have invented a new and useful Improvement in Roller Side Bearings, of which the following is a specification.

This invention relates to side bearings, and particularly to roller side bearings for railway cars, and other similar purposes.

It is an object of the invention to provide a roller side bearing which is simple, compact, durable, economical to manufacture, easy to install and efficient in operation.

It is a special object to provide a side bearing of this character in which the cage is independent of both the upper and lower bearing surfaces, which is entirely open at both its top and bottom portions, which telescopically and removably receives the means directly supporting the lower bearing plate, and which is automatically self-cleaning.

It is also a special object to provide a side bearing in which the cage is not only open at both its top and bottom and formed independently of the bearing plates proper and as a separate unit, but is freely floating regardless of the various positions assumed by the several part, and which automatically co-acts with the top bearing plate to constantly exclude dust, dirt and other foreign materials from the top of the cage.

These and other objects of the invention will more fully appear when taken in conjunction with the following description and appended claims.

In the accompanying drawings Fig. 1 is a vertical sectional view through the preferred embodiment of the invention; Fig. 2 a similar view taken in a plane at right angles to that of Fig. 1; Fig. 3 a view similar to Fig. 1 illustrating a modfied form of the invention; and Fig. 4 a side elevation illustrating a still further modified form of the invention.

Referring to Figs. 1 and 2, the main bolster of the truck is indicated at 1 upon which is mounted the lower bearing member shown at 2, and for the purpose of conveniently mounting the lower bearing in place, the same may be provided with the laterally extending base flanges 3, 3' which are attached to the bolster by means of the bolts 4, 4'. The lower bearing member 3 extends upwardly for a short distance above the bolster 1, and is preferably provided with a superposed wear plate 5 attached to the bearing member in any suitable way, as by the rivets indicated at 6, 6'. The upper surface of both the bearing member 2 and the wear plate 5 slopes downwardly from its opposite ends towards an intermediate flat area, the intermediate flat area of the wear plate being designated by the reference numeral 7. It is understood that the inclination of the extremities towards an intermediate flat area is in itself an old feature in the art and is intended to render the free roller employed self-centering, in an obvious manner.

The upper bearing plate is indicated at 8 and is suitably attached to the body bolster in accordance with the usual practice. Interposed between the lower bearing member and the upper bearing plate 8 is a tubular cage 9. The cage 9, in the form illustrated, is rectangular in shape, being provided with the side walls, 10, 10' and the end walls 11, 11' but has both its top and bottom entirely open, as clearly shown in the drawings. The cage is of such dimensions that it readily telescopically receives the upwardly projecting lower bearing 2 within the interior thereof, and the cage which is formed as an independent or separate unit constitutes a floating cage which is interposed between the upper and lower bearing members.

In order to constantly urge the cage 9 into abutting yielding contact with the upper bearing plate 8, tension means such as the coil springs 12, 12' are interposed between the flanges 3, 3' and the lower base flanges of the cage, in the manner as clearly shown in Fig. 1 of the drawings.

A cylindrical roller 13 is adapted to rest upon and be supported by the lower bearing plate and housed within the cage. This roller is of the so-called free type, cylindrical in shape, and so proportioned that the flat ends thereof lie a comparatively short distance from the side walls 10, 10' of the cage. The side walls 10, 10' are provided with the cleaning openings 14, 14', respectively, and the end walls 11, 11' are likewise equipped with the respective cleaning openings 15, 15'. The cage is in fact rendered substantially self-cleaning due to the provision of an open bottom thereof, but the cleaning openings 14, 14', 15, 15' may also be provided if found desirable.

In operation, the coil springs 12, 12' constantly keep the upper edge of the cage 9 in contact with the upper bearing plate 8, while at the same time permitting the bearing plate 8 to descend into contact with the roller 13 in the normal functioning of the side bearing. After the upper bearing plate 8 has been moved into contact with the roller 13, as in rounding a curve, subsequent relative turning movement between the truck and body causes the roller to travel towards the ends of the bearing, rolling upon the inclined extremities of the wear plate 5 or the similarly fashioned bearing surface of the lower bearing member 2, as the case may be. As soon as the upper bearing plate 8 is lifted to break contact with the roller, the roller immediately under the influence of gravity returns to its centered position upon the intermediate flat portion 7, as shown in Fig. 1.

Due to the formation of the cage as an independent separate unit, which freely floats in the manner previously described, and is constantly and yieldingly pressed upwardly into contact with the upper bearing plate regardless of the relative positions between the upper and lower bearing surfaces, all dust, dirt, and other foreign substances are effectively excluded from the top of the cage, thus effectively preventing deterioration of the bearing due to these causes. Any foreign substances which happen to reach the interior of the cage are automatically discharged through its open bottom or the cleaning openings provided in the side and end walls thereof.

The embodiment illustrated in Fig. 3 of the drawings, corresponds substantially to the form shown in Figs. 1 and 2 of the drawings, as previously described, with the exception that the resilient springs for constantly urging the floating cage into abutting contact with the upper bearing plate are omitted. In other respects this form is substantially identical with the first described embodiment. For this reason, it will be unnecessary to describe either the construction or operation thereof in detail. Corresponding parts of the two embodiments have therefore been designated by the same reference numerals in Fig. 3 of the drawings but with an attached exponent *a*.

In Fig. 4 there is illustrated a still further modification of the invention. In this embodiment, the end walls of the cage are indicated at 20, 20', and the rear wall of the cage is formed by the member 21, the cage being rectangular in shape as in both of the previously described forms. In this case, however, the cage may be initially formed with but a single front side wall and the two end walls 20, 20' and then suitably attached to the member 21 as by welding, or if preferred, these parts of the cage may be formed as an integral casting with the member 21.

The member 21 may form either a part of the truck, as for instance a part of the so-called longitudinal bolster, or be attached thereto, or may form a part of the truck body. The particular portion of which it forms a part or to which it is attached is immaterial provided the member 21 and the other portions forming the complete cage are constructed independently of the main bolsters of the truck and body, as well as independently of the lower and upper bearing members attached to the respective main bolsters. In this embodiment, the resilient springs 12, 12' are also omitted, the entire cage being supported in the position shown in Fig. 4 due to its construction or mode of attachment in the manner described.

The portions of the embodiment illustrated in Fig. 4 not particularly described in detail correspond to those in the embodiment of Figs. 1 and 2, and therefore have been designated with the same reference numerals with an attached exponent *b*.

It is noted that in all of the embodiments illustrated and described, due to the fact that the cage is formed as an independent or separate unit so that the lower bearing member may be readily removed or inserted within the cage, irrespective whether the cage is in the form shown in Fig. 4, or whether it consists merely of a rectangular tubular element entirely disconnected from the truck or body.

It is thus seen that the invention provides a roller side bearing for railway cars which is comparatively simple, compact, easy to install, and efficient in operation, and when constructed in the preferred manner provides a bearing which is automatically self-cleaning, and one which functions to effectively exclude the entrance of dirt and foreign material from the open top of the cage.

I claim:

1. A side bearing for railway cars comprising a tubular floating cage having a passageway extending completely therethrough open at both its top and bottom, a lower supporting bearing movable independently of the cage and forming a unit supported separately from the cage, and a roller operatively engaging the said bearing and housed within the cage.

2. A side bearing for railway cars comprising a lower roller supporting bearing, a floating cage forming a separate unit telescopically embracing the bearing, and a free roller supported by said bearing and housed within the cage.

3. A side bearing for railway cars comprising a lower roller supporting bearing, a rectangular floating cage open at both its top and bottom telescopically embracing the said bearing, and a free roller resting upon the said bearing and housed within the said cage.

4. In combination in a roller side bearing for railway cars, a roller supporting bearing for the roller, a tubular floating cage formed as a separate unit telescopically embracing the said bearing, a roller supported by the said lower bearing disposed within the cage, an upper bearing member positioned above the cage, and resilient means for yieldingly urging the cage into abutting relation with the said upper bearing member.

5. In combination in a roller side bearing for railway cars, a lower bearing member attached to the truck bolster, an upper bearing member attached to the body bolster, an independently formed tubular floating cage open at both its top and bottom interposed between the said bearing members, a free roller supported by the lower bearing member and housed within the cage, and resilient means for constantly urging the cage upwardly into yielding abutting contact with the upper bearing member.

6. In combination in a roller side bearing for railway cars, an upwardly projecting bearing member attached to the truck bolster, an upper bearing plate carried by the body bolster, an independently formed floating cage having side and end walls open at both its top and bottom telescopically embracing the lower bearing member, a free roller disposed within the cage and supported by the lower bearing member, and resilient tension means for constantly urging the cage into contact with the upper bearing plate, said upper bearing plate having an area greater than the top of the cage whereby to completely cover the same.

7. A side bearing for railway cars comprising a lower roller supporting bearing, an upper bearing spaced above the said lower bearing, a tubular cage open at both its top and bottom providing a passageway extending completely therethrough interposed between said lower and upper bearings, said cage forming a separate unit supported independently of the said lower and upper bearings, a free roller normally out of contact with the cage supported by said lower bearing and housed within the cage the relative cross-sectional dimensions of said passageway and roller permitting vertical movement of said cage without tilting independently of the roller and regardless of the position of the roller longitudinally of the said lower bearing.

In testimony whereof, I sign my name.

ARNOLD STUCKI.